United States Patent
Kim et al.

(10) Patent No.: US 6,256,560 B1
(45) Date of Patent: Jul. 3, 2001

(54) METHOD FOR CORRECTING POSITION OF AUTOMATED-GUIDED VEHICLE AND APPARATUS THEREFOR

(75) Inventors: Jin-ki Kim, Suwon; Myung-joon Kal, Seoul, both of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/510,146

(22) Filed: Feb. 22, 2000

(30) Foreign Application Priority Data

Feb. 25, 1999 (KR) .................................................. 99-6325
Jun. 30, 1999 (KR) .................................................. 99-26194

(51) Int. Cl.$^7$ ....................................................... G05D 1/00
(52) U.S. Cl. .............................. 701/23; 701/69; 701/210; 318/568.12; 180/168
(58) Field of Search ................................. 701/23, 26, 69, 701/210; 180/167, 168; 318/568.12

(56) References Cited

U.S. PATENT DOCUMENTS 5,170,351 * 12/1992 Nemoto et al. ......................... 701/23
5,525,884 * 6/1996 Sugiura et al. ....................... 318/587
5,758,298  5/1998 Guldner .
5,911,767  6/1999 Garibotto et al. .
5,961,559 * 10/1999 Shimbara et al. ..................... 701/23

* cited by examiner

Primary Examiner—William A. Cuchlinski, Jr.
Assistant Examiner—Gertrude Arthur
(74) Attorney, Agent, or Firm—Larson & Taylor PLC

(57) ABSTRACT

A method for correcting an actual stop position of an AGV for carrying out a task while stopped along a travelling path includes the steps of: a) establishing at least one reference position as a basis for determining an actual stop position of the AGV on the travelling path; b) ascertaining the reference position where the AGV actually stops, based on image data of the actual stop position, and calculating the difference between the reference position and the actual stop position; c) ascertaining whether the difference is within an allowable limit of a predetermined reference value; and d) controlling the AGV to make the difference within the allowable limit of the reference value if the difference is not within the allowable limit. With this method, and an apparatus therefor, the actual stop position of the AGV on the travelling path can be easily determined, and the actual stop position of the vehicle body or the manipulator of the AGV can be easily corrected to be located at respective predetermined correct working positions.

22 Claims, 5 Drawing Sheets

METHOD FOR CORRECTING POSITION OF AUTOMATED-GUIDED VEHICLE AND APPARATUS THEREFOR

FIELD OF THE INVENTION

The present invention relates to an automated-guided vehicle (hereinafter referred to as "AGV") system, and more particularly, to a method for correcting a stop position of the AGV and an apparatus therefor.

BACKGROUND OF THE INVENTION

Automated-guided vehicles are usually used in severe environments where a worker has a difficulty or an inefficiency in direct performance of a task. That is, the AGVs transfer articles or carry out a predetermined task by a manipulator through an automatic control, while stopped at work stations provided along a predetermined travelling path.

FIG. 1 is a perspective view of a conventional AGV, and FIG. 2 is a top plan view of the AGV located on a travelling path, for illustrating a conventional method for correcting a stop position of the AGV.

The AGV is formed with a vehicle body 51 and a manipulator 52 mounted on the top of the vehicle body 51 for carrying out a predetermined task. Under both sides of the vehicle body 51 a pair of drive wheels 53 are installed for driving the AGV. Wheel driving motors 55 for driving the drive wheels 53 are installed beside the drive wheels 53. In the front and rear ends of the vehicle body 51 a pair of track sensors 57 are installed for detecting electromagnetic waves from a travelling direction mark (not shown) on the travelling path 70. A controller (not shown) controls the wheel driving motors 55 and determines the travelling direction of the AGV, according to the values of the electromagnetic waves detected by the track sensors 57.

On the travelling path 70 a stop mark 75 made of magnetic material is attached at the point or workplace at which the AGV has to stop. On the bottom of the vehicle body 51 a stop sensor 60 is installed for sensing a magnetic field from the stop mark 75. On one lateral side of the vehicle body 51 first and second sensor groups 62 and 64 are installed along the longitudinal direction of the vehicle body 51. Each of the first and second sensor groups 62 is comprised of a plurality of ultrasonic wave sensors. On a side wall 71 installed beside the travelling path 70 of the AGV, first and second reflectors 72 and 74 are installed for reflecting ultrasonic waves from the sensor groups 62 and 64. The first and second reflectors 72 and 74 are installed with the same interval as that of the first and second sensor groups 62 and 64 and at the same height as that of these sensor groups 62 and 64, to correspond to each other.

With this configuration, when the AGV stops according to the signal that the stop mark 75 is detected from the stop sensor 60, ultrasonic waves are (a) generated from the first and second sensor groups 62 and 64, (b) reflected by the first and second reflectors 72 and 74, and (c) then returned to the first and second sensor groups 62 and 64. The controller determines an actual stop position of the AGV based on the strength of the returned ultrasonic waves.

More particularly, coordinates are set initially wherein the center of the vehicle body 51 is the origin (0), the travelling path 70 is a Y-axis, and the perpendicular axis to the Y-axis and passing through the origin is an X-axis. Then, the distance a between the first sensor group 62 and the first reflector 72 on the X-axis, and the distance b between the second sensor group 64 and the second reflector 74 on the X-axis, are calculated. These distances a and b can be obtained by multiplying the speed of the ultrasonic waves by the time consumed in returning to the sensor groups. The angle θ by which the vehicle body 51 deviates from the travelling path 70 is obtained by using the difference a−b between a and b and the distance d between the first and second sensor groups 62 and 64.

To determine how far the vehicle body 51 is deviated from the stop mark 75 in the travelling direction thereof, a distance c between the sensor group 62 or 64 and the reflector 72 or 74 on the Y-axis is calculated. The distance c can be calculated by using the strength of the ultrasonic waves generated by the sensor group 62 or 64 and returned thereto after reflecting from the reflector 72 or 74.

According to the actual stop position of the vehicle body 51 of the AGV determined as described above, the controller controls the wheel driving motors 55 and relocates the vehicle body 51 at a predetermined correct working position.

However, in the conventional AGV position correcting method, a multiplicity of ultrasonic wave sensors are required, thereby raising the cost of production. Further, since the reflectors 72 and 74 have to be installed corresponding to the ultrasonic wave sensor groups 62 and 64 of the AGV, the work of installation is complicated.

In the conventional art, after relocation of the vehicle body 51 is conducted according to the value calculated from the comparison of the actual stop position of the vehicle body 51 and the predetermined correct stop position of the vehicle body, the manipulator carries out the predetermined work. Therefore, the AGV has to be inactive until the relocation of the vehicle body 51 is finished, thereby increasing an overall time for completing the task.

With the conventional art using the ultrasonic waves sensors, only a relative position of the vehicle body 51 to the travelling path is determined. Therefore, an extra device is needed to determine a reference position by which a correct working position of the vehicle body on the travelling path is taught, thereby increasing the cost of production.

BRIEF SUMMARY OF THE INVENTION

Accordingly, it is an object of the present invention to provide a method for correcting an actual stop position of an AGV and an apparatus therefor in which a predetermined reference position on a travelling path at a workplace and an actual stop position of the AGV relative to the reference position are easily detected.

Another object of the present invention is to provide a method for correcting an actual stop position of an AGV and an apparatus therefor in which a reference position and an actual stop position of the AGV relative thereto are determined at the same time, by which an actual stop position of a vehicle body of the AGV or an actual stop position of a manipulator mounted on the AGV can be easily corrected.

Still another object of the present invention is to provide a method for correcting an actual stop position of an AGV and an apparatus therefor in which a reference position and an actual stop position of the AGV relative thereto are determined, and at the same time, an actual stop position of a vehicle body of the AGV or an actual stop position of a manipulator mounted on the AGV can be corrected.

To accomplish the objects, according to one aspect of the present invention, there is provided a method for correcting an actual stop position of an AGV for carrying out a task while the AGV is stopped at a workplace located along a travelling path for the AGV, comprising the steps of: a) establishing at least one reference position at the workplace which serves as a reference for determining an actual stop position of the AGV stopped at that workplace on the travelling path; b) ascertaining the reference position of the workplace where the AGV actually stops, based on image data at the actual stop position, and calculating a difference between the reference position and the actual stop position; c) ascertaining whether the difference is within an allowable limit of a predetermined reference value; and d) controlling the AGV to make the difference within the allowable limit of the predetermined reference value if the difference is not within the allowable limit.

Preferably, a position of a vehicle body of the AGV or a manipulator mounted on the AGV is corrected in the step (d). Preferably, the reference value is an offset value of the reference position corresponding to a predetermined correct working position for the AGV, relative to the correct working position.

Preferably, the step (a) comprises the sub-step of providing a position indicator at the workplace for determining the reference position and the actual stop position; and the step (b) comprises the sub-steps of ascertaining data of the reference position and the actual stop position from the position indicator and calculating the difference between the actual stop position and the reference position, based on the ascertained data.

Preferably, the position indicator includes a barcode for ascertaining the reference position and the actual stop position.

Preferably, the position indicator includes a barcode for ascertaining the reference position and the actual stop position, and a correction mark having reference coordinates for determining how far the actual stop position is deviated from the correct working position.

Preferably, the correction mark is formed in pairs on respective sides of the barcode, and an indicia with the reference coordinates is formed at the center of each correction mark.

Preferably, the offset value is obtained by setting reference coordinates with respect to the reference position and measuring deviation of the reference coordinates from the correct working position.

Preferably, the difference is obtained by measuring deviation of the axes of the reference coordinates from the actual stop position.

Preferably, the reference coordinates are orthogonal coordinates, and the deviation is indicated as deviation distances relative to the axes of the orthogonal coordinates and a deviation angle relative to one axis of the orthogonal coordinates.

To accomplish the above objects, according to another aspect of the present invention, there is provided a method for correcting an actual stop position of an AGV equipped with a manipulator for carrying out a task while the AGV is stopped at a workplace located along a travelling path for the AGV, the method comprising the steps of: a) establishing at least one reference position at the workplace which serves as a reference for determining an actual stop position of the AGV stopped at that workplace on the travelling path; b) ascertaining the reference position of the workplace where the manipulator actually stops, based on image data of the actual stop position, and calculating a difference between the reference position and the actual stop position; c) ascertaining whether the difference is within an allowable limit of a predetermined reference value; and d) controlling the manipulator to make the difference within the allowable limit of the predetermined reference value if the difference is not within the allowable limit.

Preferably, the reference value is an offset value of the reference position corresponding to a predetermined correct working position for the manipulator, relative to the correct working position.

Preferably, the step (a) comprises the sub-step of providing a position indicator for determining the reference position; and the step (b) comprises the sub-steps of ascertaining data of the reference position and the actual stop position indicator, and calculating the difference between the actual stop position and the reference position, based on the ascertained data.

Preferably, the position indicator includes a barcode for ascertaining the reference position and the actual stop position.

Preferably, the position indicator includes a barcode for ascertaining the reference position and the actual stop position, and a correction mark having reference coordinates for determining how far the actual stop position is deviated from the correct working position.

Preferably, the correction mark is formed in pairs on respective sides of the barcode, and an indicia with the reference coordinates is formed at the center of each correction mark.

Preferably, the offset value is obtained by setting reference coordinates with respect to the reference position and measuring deviation of the reference coordinates from the correct working position.

Preferably, the difference is obtained by measuring deviation of the reference coordinates from the actual stop position.

Preferably, the reference coordinates are orthogonal coordinates, and the deviation is indicated as deviation distances relative to the axes of the orthogonal coordinate and a deviation angle relative to one axis of the orthogonal coordinates.

To accomplish the above objects, according to still another aspect of the present invention, there is provided an apparatus for correcting an actual stop position of an AGV equipped with a manipulator for carrying out a task while the AGV is stopped at a workplace located along a travelling path for the AGV, the apparatus comprising: at least one position indicator installed at the workplace on the travelling path, determining a reference position at the workplace; ascertaining means for ascertaining data of the reference position from the position indicator; an image data processor which calculates a difference between the actual stop position of the manipulator and the reference position, based on the ascertained data of the ascertaining means; a memory which stores a predetermined reference value; an ALU (arithmetic logic unit) which calculates a position correction value to correct an actual position of the manipulator by comparing the difference and the predetermined reference value; and a controller which controls the manipulator according to the position correction value.

Preferably, the reference value is an offset value of the reference position corresponding to a predetermined correct working position for the manipulator, relative to the correct working position.

Preferably, the ascertaining means is a CCD camera.

BRIEF DESCRIPTION OF THE SEVERAL VIEW OF THE DRAWINGS

The above features and advantages of the present invention will become more apparent by describing in detail preferred embodiments of the present invention with reference to the attached drawings in which.

DETAILED DESCRIPTION OF THE INVENTION

Preferred embodiments of the present invention will be described in detail with reference to the accompanying drawings.

Figure 1:
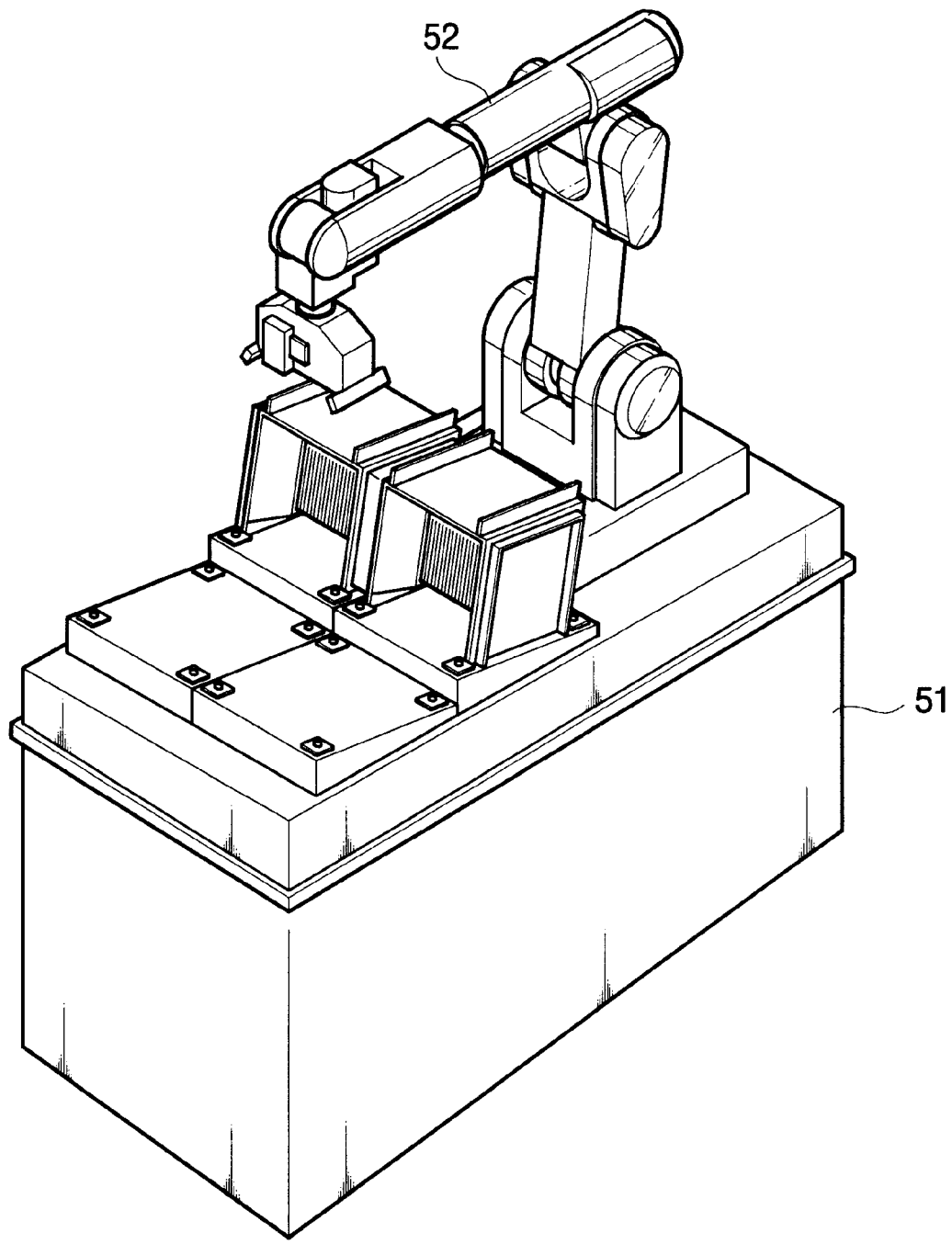
FIG. 1 is a perspective view of a conventional AGV.
Figure 2:
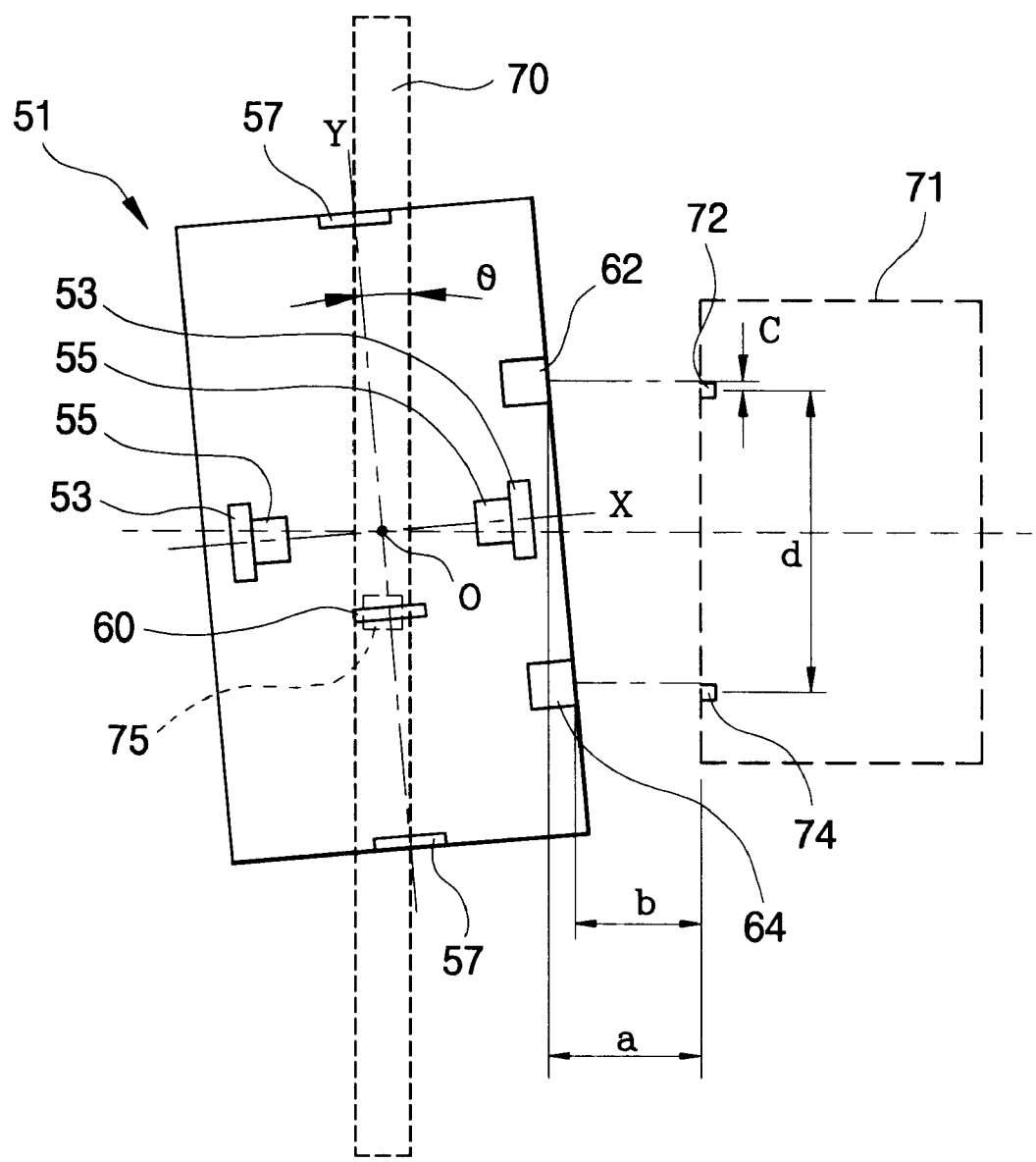
FIG. 2 is a top plan view of an AGV of FIG. 1 located on a travelling path, for illustrating a conventional AGV position correction method.
Figure 3:
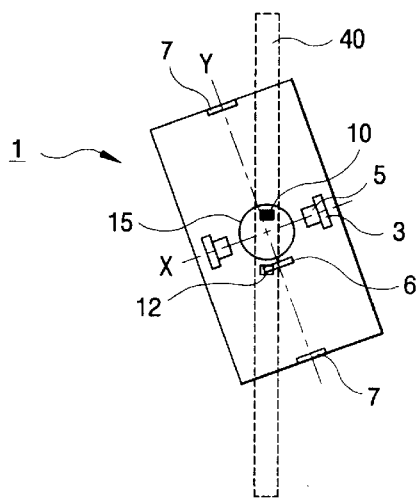
FIG. 3 is a top plan view of an AGV located on a travelling path, for illustrating an AGV position correcting method according to the present invention.
Figure 4:
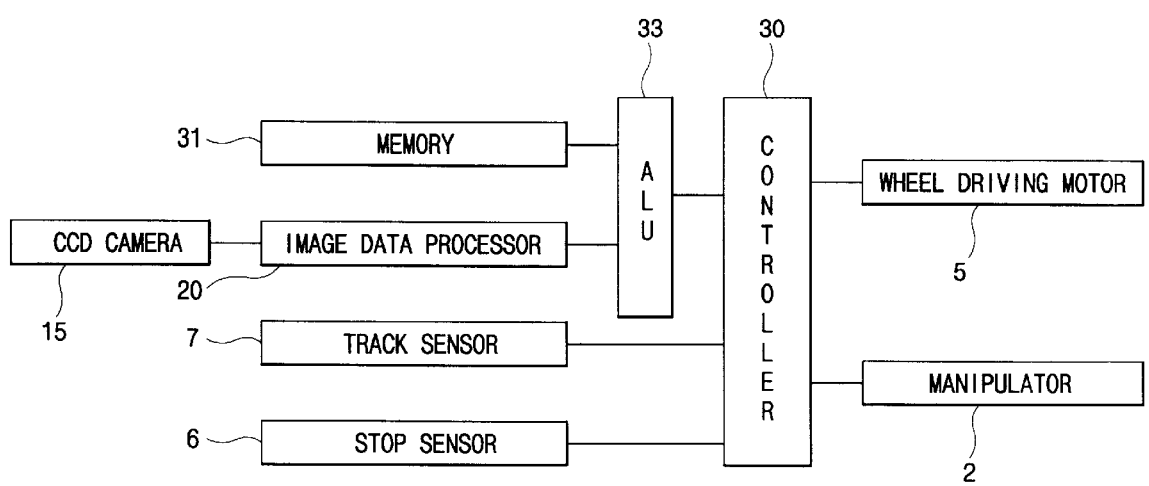
FIG. 4 is a block diagram of an AGV position correcting apparatus for an AGV according to the present invention.

As shown in FIGS. 3 and 4, an AGV according to the present invention is comprised of a vehicle body 1 and a pair of drive wheels 3 installed under both sides of the vehicle body 1. Wheel driving motors 5 are installed beside the respective drive wheels 3. In the front and rear ends of the vehicle body 1 a pair of track sensors 7 are respectively provided for detecting a travelling path 40 for the AGV. Between the track sensors 7 a stop sensor 6 is installed for sensing signals from a stop mark 12 positioned at a workplace located on the travelling path 40. Under the bottom of the vehicle body 1 a CCD camera 15 is installed for taking images of a barcode 10 located at the workplace on the travelling path 40. Over the vehicle body 1 is mounted a manipulator 2 for carrying out a predetermined task. The vehicle body 1 is equipped with an image data processor 20 for analyzing image data taken by the CCD camera 15.

A workplace at which the vehicle stops to conduct a predetermined task is set along the travelling path 40. A position indicator or barcode 10 is attached or located at the workplace. On the travelling path 40 at the workplace a stop mark 12 is also attached for generating a stop signal to the vehicle, adjacent to the position indicator or barcode 10.

The AGV position correcting apparatus according to the present invention, as shown in FIG. 4, is comprised of: the stop sensor 6 for detecting the stop signal from the stop mark 12, the track sensor 7 for detecting a track indicating the travelling path of the AGV, a CCD camera 15 for taking images of the position indicator 10, the image data processor 20 for analyzing the image data from the CCD camera 15, a memory 31 for storing reference values for position correction, an arithmetic logic unit (hereinafter, "ALU") 33 for calculating a position correction value based on the reference values stored in the memory 31 and an actual stop position of the vehicle determined by the image data processor 20, and a controller 30 for correcting an actual stop position of the vehicle body 1 or the manipulator 2 based on the position correction value calculated by the arithmetic logic unit 33. It will be appreciated that the memory 31 preferably stores a plurality of reference values of various predetermined reference positions corresponding to a plurality of the barcodes 10 located at a respective plurality of workplaces—so that the present invention can be used at more than one workplace (although the invention discussed hereafter may reference only a single workplace which will be exemplary).

Figure 5:
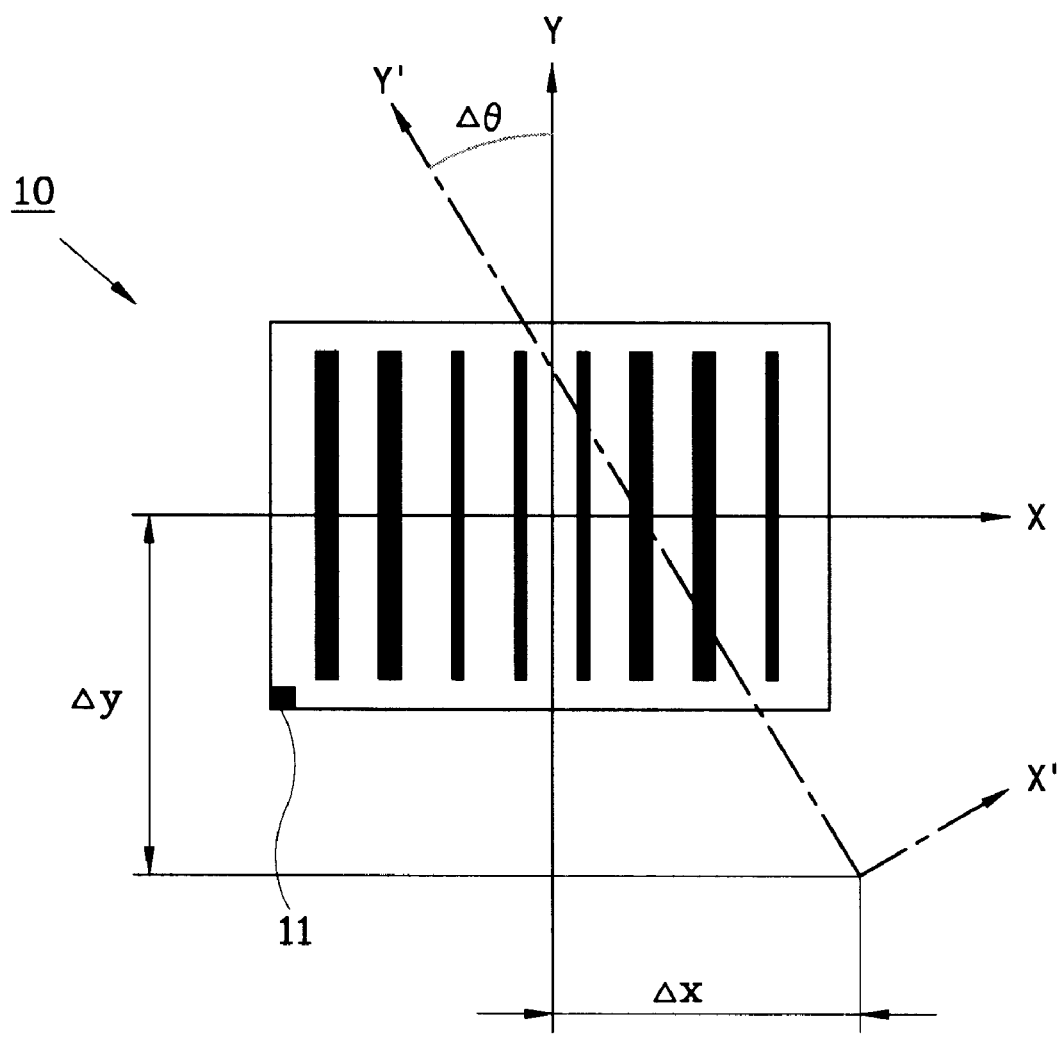
FIG. 5 is a schematic view for illustrating a position indicator according to one embodiment of the present invention and an AGV position correcting method therefor.

FIG. 5 is a schematic view for illustrating an exemplary position indicator for a workplace according to one embodiment of the present invention, and an AGV position correcting method therefor.

The reference values stored in the memory 31 for the workplace are initially set through the following process:

Offset values of the reference positions relative to predetermined correct working positions are measured after moving the AGV to the workplaces on the travelling path and these offset values of the reference positions are then stored in the memory 31 as the reference values for the respective working stations. In more detail and considering a single workplace, the AGV is moved and then stopped at the selected workplace in the predetermined correct working position on the travelling path 40. From the correct working position, the CCD camera 15 then takes pictures of the barcode 10 installed at the workplace. Next, the image data processor 20 reads the image of the barcode 10 taken by the camera 15, and determines the reference position of the barcode 10 corresponding to the correct working position. Then, the image data processor 20 calculates offset values to determine the correct working position relative to the reference position of the barcode. The offset values are obtained by measuring deviation of the correct working position from the reference coordinates of the reference position. Referring to FIG. 5 to explain this in more detail, assuming that the reference coordinates of the reference position of the barcode 10 are represented by axes of X and Y and coordinates of the correct working position are axes of X' and Y', the distance ΔX between the axes of X and X', the distance ΔY between the axes of Y and Y', and the angle Δθ between the axes Y and Y' can be calculated as the offset values. If the correct working position of the AGV is the same as the reference position, of course, the offset values are 0.

The offset values ΔX, ΔY, and Δθ obtained by the above calculations are stored in the memory 31, to correspond to the stored reference positions at the associated workplaces, and are used as the reference values to determine whether the actual stop position is identical to the correct working position at the respective workplaces.

According to the embodiment disclosed above, the AGV position correcting method will be explained in the following steps:

The controller 30 stops operation of the wheel driving motors 5 to stop the vehicle body 1 when the stop sensor 6 detects a magnetic field from the stop mark 12 while the AGV is moving on the travelling path 40. This establishes the actual stop position of the AGV.

The CCD camera 15 takes images of the barcode 10 provided at the workplace and transmits the image data to the image data processor 20. The image data processor 20 interprets the image data of the barcode 10 and ascertains the correct working position of the vehicle body 1 stored in the memory 31, corresponding to that barcode 10 (or workplace).

The image data processor 20 also determines the actual stop position of the AGV through the images of the barcode 10 taken by the CCD camera 15. The actual stop position is determined as a relative position to the reference position of the barcode, by measuring deviation of the actual stop position from the reference coordinates (the axes of X and Y) for the reference position. The method of measuring the deviation, calculated as deviation values, is the same as that of measuring the offset values as illustrated in FIG. 5. In other words, the image data processor 20 measures for the actual stop position a deviation distance $\Delta X'$ from the X-axis, a deviation distance $\Delta Y'$ from the Y-axis, and a deviation angle $\leftarrow\theta'$ from the Y-axis.

In one corner of the barcode 10 an indicator 11 is provided for indicating the leading or trailing end of the barcode 10, as shown in FIG. 5, so that the barcode 10 can be properly interpreted regardless of forward or backward travelling of the AGV. Thus, the values of $\Delta X'$, $\Delta Y'$ and $\Delta\theta$ representing the deviation of the actual stop position relative to the reference coordinates can be obtained, irrespectively of the travelling directions of the AGV.

The ALU 33 obtains position correction values for position correction by calculating the differences between the respective deviation values of the actual stop position ($\Delta X'$, $\Delta Y'$, $\Delta\theta'$) obtained by the image data processor 20 and the respective reference (offset) values ($\Delta X$, $\Delta Y$, $\Delta\theta$) stored in the memory 31.

The controller 30 controls the wheel driving motors 5 to correct the actual stop position of the vehicle body 1, to thereby locate the AGV on the predetermined correct working position, where respective position correction values are over or exceed associated predetermined values. More particularly, where the position correction value ($\Delta Y'-\Delta Y$) is over the predetermined value therefor, the controller 30 controls the wheel driving motors 5 to move the vehicle body 1 forward or backward. Where the position correction value ($\Delta X'-\Delta X$) or the position correction value ($\Delta\theta'-\Delta\theta$) is over the respective predetermined value thereof, the controller 30 controls the wheel driving motor 5 to move the vehicle body 1 laterally or to rotate the vehicle body 1.

When correcting the position of the AGV based on the position correction value calculated by the arithmetic logic unit 33, the actual position of the manipulator 2 may be corrected, in lieu of correcting the actual position of the vehicle body 1. Because the memory 31 also stores correct working positions of the manipulator 2 corresponding to the correct working positions of the AGV, the controller 30 controls the manipulator 2 to be located on the correct working positions thereof as stored in the memory 31 based on the position correction value for the AGV calculated by the arithmetic logic unit 33.

The offset values for the correct working positions of the manipulator 2, corresponding to the reference positions, obtained according to the same method as described above referring to FIG. 5, may be stored in the memory 31 as the manipulator reference values. In this case, the AGV position correcting method will be carried out by the following process:

The CCD camera 15 and the image data processor 20 determine an actual stop position of the manipulator 2 through the same process as in the first embodiment described above. The arithmetic logic unit 33 calculates position correction values for position correction relative to the associated manipulator reference values stored in the memory 31. The controller 30 controls the manipulator 2 to be located on the correct manipulator working position, based on the manipulator position correction values calculated above.

Figure 6:
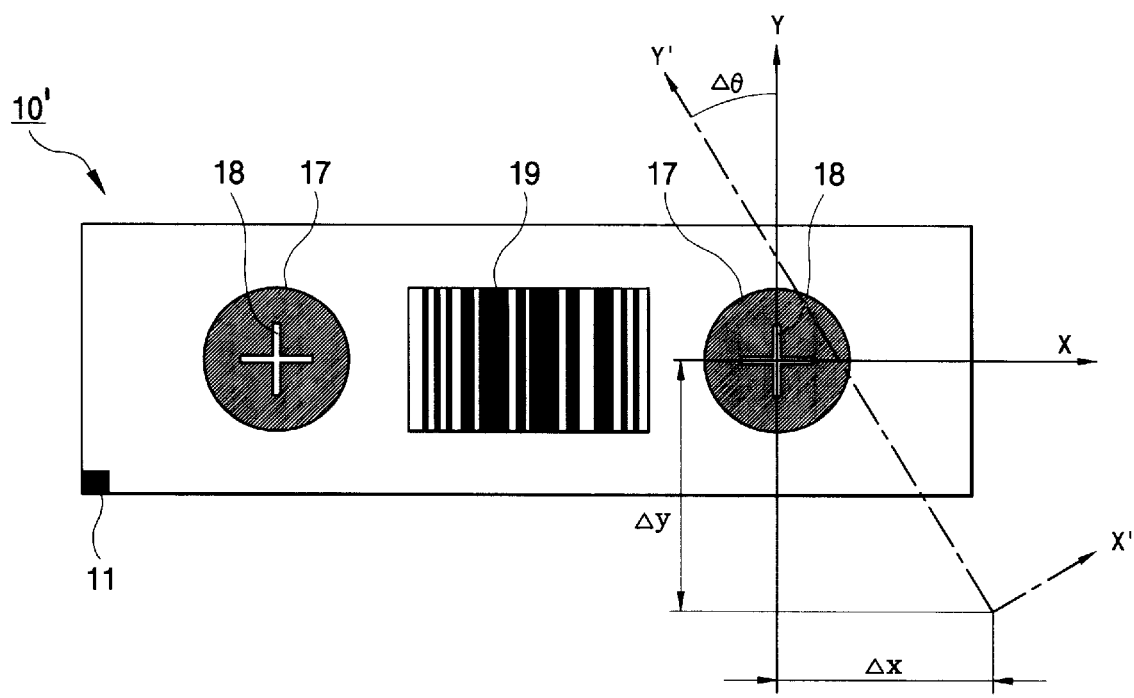
FIG. 6 is a schematic view for illustrating a position indicator according to another embodiment of the present invention and an AGV position correcting method therefor.

FIG. 6 is a schematic view for illustrating a travelling position indicator 10' according to another embodiment of the present invention. In this embodiment, the parts of indicator 10' which are identical to those described in the above-described embodiment for barcode 10 will be given the same reference numbers, and redundant descriptions thereof will be avoided.

The indicator 10' includes a barcode 19 for indicating the position where the vehicle body 1 has to stop at the workplace on the travelling path 40, and a correction mark 17 at each side for ascertaining how far the actual stop position of the vehicle body 1 is deviated from the correct working position. The correction mark 17 is circular. In the center part of the correction mark 17 is formed an indicia in the form of a cross 18 having axes of X and Y as reference coordinates. However, the correction mark can have a variety of shapes and reference axes as desired.

The method of setting reference values for the workplaces to be stored in the memory 31 is as follows:

Offset values of predetermined correct working positions relative to the reference positions of correction marks 17 after moving the AGV to the workplaces on the travelling path 40 are measured and then stored in the memory 31 as reference values. In more detail and considering a single workplace, the AGV is moved and then stopped at the selected workplace in the predetermined correct working position on the travelling path 40. From the correct working position, the CCD camera 15 then takes images of the indicator 10' including the correction marks 17 and the barcode 19 installed at the reference position of the workplace corresponding to the correct working position. Next, the image data processor 20 reads the images of the barcode 19 taken by the camera 15 and determines the reference position of the barcode 19 from the memory 31. Then, the image data processor 20 measures deviation of the correct working position from reference coordinates (the axes of X and Y) indicated on the correction mark 17 selected, to calculate an offset value for the reference position relative to the correct working position. That is, as illustrated in FIG. 6, assuming that coordinates of the correct working position are represented by axes of X' and Y', the distance $\Delta X$ between the axes of X and X', the distance $\Delta Y$ between the axes of Y and Y', and the angle $\Delta\theta$ between the axes of Y and Y' can be calculated as the offset values.

The offset values $\Delta X$, $\Delta Y$, and $\Delta\theta$ obtained by the above calculation are stored in the memory 31, to correspond to the stored reference positions at the associated workplaces, and are used as reference values to determine a relative actual stop position of the AGV with respect to the correct working position.

According to the embodiment disclosed above, the AGV position correcting method will be explained in the following steps:

The controller 30 stops operation of the wheel driving motors 5 to stop the vehicle body 1 when the stop sensor 6 detects a magnetic field from the stop mark 12 while the AGV is moving on the travelling path 40.

The CCD camera 15 takes images of the barcode 19 and transmits the image data to the image data processor 20. The image data processor 20 interprets the images of the barcode 19 and ascertains the correct working position of the vehicle body 1 corresponding to the barcode 19 from the memory 31.

The image data processor 20 determines the actual stop position of the AGV through the images of the barcode 19 and the correction mark 17 taken by the CCD camera 15, by ascertaining deviation of the actual stop position from the reference coordinates (the axes of X and Y) on the correction mark 17.

The method of measuring the deviation, calculated as deviation values, is the same as that of measuring the offset values as illustrated in FIG. 6. In other words, the image data processor 20 measures for the actual stop position a deviation distance $\Delta X'$ from the X-axis, a deviation distance $\Delta Y'$ from the Y-axis and a deviation angle $\Delta\theta'$ from the Y-axis. In one corner of the barcode 19 an indicator 11 is provided for indicating the leading or trailing end of the barcode 19, so that the barcode 19 can be properly interpreted regardless of forward or backward travelling of the AGV. Thus, values of $\Delta X'$, $\Delta Y'$ and $\Delta\theta'$ representing the deviation values of the actual stop position from the reference coordinates can be obtained, irrespectively of the travelling directions thereof.

The arithmetic logic unit 33 obtains position correction values for position correction by calculating the difference between the respective deviation values of the actual stop positions ($\Delta X'$, $\Delta Y'$, $\Delta\theta'$) and the respective reference values ($\Delta X$, $\Delta Y$, $\Delta\theta$) stored in the memory 31.

The controller 30 controls the wheel driving motors 5 to correct the actual stop position of the vehicle body 1 to locate the AGV on the predetermined correct working position, where the respective position correction values are over associated predetermined values. In more detail, where the position correction value ($\Delta Y'-\Delta Y$) is over the predetermined value therefor, the controller 30 controls the wheel driving motors 5 to move the vehicle body 1 forward or backward. Where the position correction value ($\Delta X'-\Delta X$) or ($\Delta\theta-\Delta\theta$) is over the respective predetermined values therefor, the controller 30 controls the wheel driving motors 5 to move the vehicle body 1 laterally or to rotate the vehicle body 1.

When correcting the position of the AGV based on the position correction value calculated by the arithmetic logic unit 33, the actual position of the manipulator 2 can be corrected, in lieu of correcting the actual position of the vehicle body 1. Because the memory 31 also stores correct working positions of the manipulator 2 corresponding to the correct working positions of the AGV, the controller 30 controls the manipulator 2 to be located on the correct working positions thereof as stored in the memory 31 based on the position correction values for the AGV calculated by the arithmetic logic unit 33.

The offset values of the correct working positions of the manipulator 2 relative to the reference positions obtained according to the same method as described above referring to FIG. 6, can be stored in the memory 31 as the manipulator reference values. In this case, the method for correcting the actual stop position of the AGV will be carried out by the following process:

The CCD camera 15 and the image data processor 20 determine an actual stop position of the manipulator 2 through the same process as in the first embodiment described above. The arithmetic logic unit 33 calculates position correction values for position correction based on the associated manipulator reference values stored in the memory 31. The controller 30 controls the manipulator 2 to be located on the correct manipulator working position, based on the manipulator position correction values calculated above.

As described above, since the position indicator 10 is installed on the travelling path 40, and since the CCD camera 15 for taking pictures of the indicator 10' and the image data processor 20 for interpreting the image data obtained by the CCD camera 15 are mounted on the AGV, the reference positions and the relative positions of the AGV can be easily determined. Accordingly, positions of the vehicle body or the manipulator of the AGV can be easily corrected.

In accordance with the present invention described above, correct work and actual stop positions of the AGV on the travelling path can be easily determined and the actual stop positions thereof can be easily corrected so that the vehicle body or the manipulator of the AGV can be easily located at predetermined correct working positions. Therefore, work can be continuously carried out at the same time as the vehicle body stops, thereby reducing the working time and improving productivity.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method for correcting an actual stop position of an AGV for carrying out a task while the AGV is stopped at a workplace located along a travelling path for the AGV, said method comprising the steps of:
    a) establishing at least one reference position at the workplace which serves as a reference for determining an actual stop position of the AGV stopped at that workplace on the travelling path;
    b) ascertaining the reference position of the workplace where the AGV actually stops, based on image data at the actual stop position, and calculating a difference between the reference position and the actual stop position;
    c) ascertaining whether the difference is within an allowable limit of a predetermined reference value; and
    d) controlling the AGV to make the difference within the allowable limit of the predetermined reference value if the difference is not within the allowable limit.

2. The method according to claim 1, wherein one of a position of a vehicle body of the AGV and a position of a manipulator mounted on the AGV is corrected in said controlling step (d).

3. The method according to claim 1, wherein the reference value is an offset value of the reference position corresponding to a predetermined correct working position for the AGV, relative to the correct working position.

4. The method according to claim 3:
    wherein said establishing step (a) comprises the sub-step of:
        providing a position indicator at the workplace for determining the reference position and the actual stop position; and
    wherein said ascertaining step (b) comprises the sub-steps of:
        ascertaining data of the reference position and the actual stop position from the position indicator; and
        calculating the difference between the actual stop position and the reference position, based on the ascertained data.

5. The method according to claim 4, wherein the position indicator includes a barcode for ascertaining the reference position and the actual stop position.

6. The method according to claim 4, wherein said position indicator includes a barcode for ascertaining the reference position and the actual stop position, and a correction mark having reference coordinates for determining how far the actual stop position is deviated from the correct working position.

7. The method according to claim 6, wherein the correction mark is formed in pairs on respective sides of the barcode, and an indicia with reference coordinates is formed at the center of each correction mark.

8. The method according to claim 4, wherein the difference is obtained by measuring deviation of axes of the reference position from the stop position.

9. The method according to claim 6, wherein the reference coordinates are orthogonal coordinates, and the deviation is indicated as deviation distances relative to axes of the orthogonal coordinates and a deviation angle relative to one axis of the orthogonal coordinates.

10. The method according to claim 3, wherein the offset value is obtained by setting reference coordinates with respect to the reference position and measuring deviation of the reference coordinates from the correct working position.

11. A method for correcting an actual stop position of an AGV equipped with a manipulator for carrying out a task while the AGV is stopped at a workplace located along a travelling path for the AGV, said method comprising the steps of:
  a) establishing at least one reference position at the workplace which serves as a reference for determining an actual stop position of the AGV stopped at that workplace on the travelling path;
  b) ascertaining the reference position of the workplace where the manipulator actually stops, based on image data at the actual stop position, and calculating a difference between the reference position and the actual stop position;
  c) ascertaining whether the difference is within an allowable limit of a predetermined the reference value; and
  d) controlling the manipulator to make the difference within the allowable limit of the predetermined reference value if the difference is not within the allowable limit.

12. The method according to claim 11, wherein the reference value is an offset value of the reference position corresponding to a predetermined correct working position for the manipulator, relative to the correct working position.

13. The method according to claim 12:
  wherein the establishing step (a) comprises the sub-step of:
    providing a position indicator for determining the reference position; and
  wherein the ascertaining step (b) comprises the sub-steps of:
    ascertaining data of the reference position and the actual stop position from the position indicator;
    calculating the difference between the actual stop position and the reference position, based on the ascertained data.

14. The method according to claim 13, wherein the position indicator includes a barcode for ascertaining the reference position and the actual stop position.

15. The method according to claim 13, wherein the position indicator includes a barcode for ascertaining the reference position and the actual stop position, and a correction mark having reference coordinates for determining how far the actual stop position is deviated from the correct working position.

16. The method according to claim 15, wherein the correction mark is formed in pairs on respective sides of the barcode, and an indicia with reference coordinates is formed at the center of each correction mark.

17. The method according to claim 15, wherein the reference coordinates are orthogonal coordinates, and the deviation is indicated as deviation distances relative to the axes of the orthogonal coordinates and a deviation angle relative to one axis of the orthogonal coordinates.

18. The method according to claim 13, wherein the offset value is obtained by setting reference coordinates with respect to the reference position and measuring deviation of the reference coordinates from the correct working position.

19. The method according to claim 18, wherein the difference is obtained by measuring deviation of the reference coordinates from the actual stop position.

20. An apparatus for correcting an actual stop position of an AGV equipped with a manipulator for carrying out a task while the AGV is stopped at a workplace located along a travelling path for the AGV, said apparatus comprising:
  at least one position indicator installed at the workplace on the travelling path, said position indicator determining a reference position at the workplace;
  ascertaining means for ascertaining data of the reference position from the position indicator;
  an image data processor which calculates a difference between the actual stop position of the manipulator and the reference position, based on the ascertained data of said ascertaining means;
  a memory which stores a predetermined reference value;
  an arithmetic logic unit which calculates a position correction value to correct an actual position of the manipulator by comparing the difference and the predetermined reference value; and
  a controller which controls the manipulator according to the position correction value.

21. The apparatus according to claim 20, wherein the reference value is an offset value of the reference position corresponding to a predetermined correct working position for the manipulator, relative to the correct working position.

22. The apparatus according to claim 20, wherein said ascertaining means is a CCD camera.

* * * * *